US006985307B2

(12) United States Patent  
Do

(10) Patent No.: US 6,985,307 B2  
(45) Date of Patent: Jan. 10, 2006

(54) IMAGING LENS

(75) Inventor: Satoshi Do, Saitama (JP)

(73) Assignee: Satoshi Do and Milestone Co., Ltd., Saitama (JP)

( * ) Notice: Subject to any disclaimer, the term of this patent is extended or adjusted under 35 U.S.C. 154(b) by 8 days.

(21) Appl. No.: 10/828,310

(22) Filed: Apr. 21, 2004

(65) Prior Publication Data

US 2005/0030645 A1    Feb. 10, 2005

(30) Foreign Application Priority Data

Aug. 6, 2003    (JP)    ............... 2003-287946

(51) Int. Cl.  
*G02B 13/18*    (2006.01)  
*G02B 9/12*    (2006.01)

(52) U.S. Cl. .................... 359/716; 359/791

(58) Field of Classification Search ........ 359/715–716, 359/791  
See application file for complete search history.

(56) References Cited

U.S. PATENT DOCUMENTS 5,071,235 A    12/1991    Mori et al.  
6,476,982 B1 *    11/2002    Kawakami .............. 359/791

6,795,253 B2 *    9/2004    Shinohara ............... 359/716  
2004/0021957 A1 *    2/2004    Isono .................... 359/791

FOREIGN PATENT DOCUMENTS

| JP | 07-325253 | 12/1995 |
|----|-----------|---------|
| JP | 07-333502 | 12/1995 |
| JP | 08-062498 | 3/1996 |
| JP | 10-301021 | 11/1998 |
| JP | 10-301022 | 11/1998 |
| JP | 2001-075006 | 3/2001 |
| JP | 2002-221659 | 8/2002 |
| JP | 2002-244030 | 8/2002 |
| JP | 2003-149545 | 5/2003 |
| JP | 2003-149548 | 5/2003 |
| WO | WO 99/63379 | 12/1999 |

OTHER PUBLICATIONS

Patent Abstracts of Japan; vol. 1999, No. 2, Feb. 26, 1999 & JP 10 301021 A (Fuji Photo Optical Co., Ltd), Nov. 13, 1998.

* cited by examiner

*Primary Examiner*—Scott J. Sugarman  
(74) *Attorney, Agent, or Firm*—Venable, LLP; James R. Burdett

(57) ABSTRACT

In an imaging lens of the present invention, aberration is satisfactorily corrected, the optical length is short, and sufficient back focus is secured. The imaging lens of the present invention is constituted by arranging a first lens L1, an aperture diaphragm S1, a second lens L2, and a third lens L3 in succession from the object side to the image side.

4 Claims, 13 Drawing Sheets

IMAGING LENS

BACKGROUND OF THE INVENTION

1. Field of the Invention

The present invention relates to an imaging lens, and more particularly to an imaging lens which is suitable for installation into an image input device of a portable telephone or personal computer, a digital camera, a CCD camera used for monitoring purposes, a surveying device, or similar which uses a CCD or CMOS as an imaging device.

2. Description of Related Art

In such an imaging lens, the optical length, which is defined as the distance from the entrance surface on the object side of the imaging lens to the image surface (the image-forming surface of a CCD or the like), must be short. An imaging lens having a short optical length will occasionally be referred to as a compact lens below.

Taking a portable telephone as an example, the optical length must at least be shorter than the thickness of the portable telephone body. Meanwhile, the back focus, which is defined as the distance from the exit surface on the image side of the imaging lens to the image surface, is preferably as long as possible. This is due to the need to insert components such as a filter between the imaging lens and the image surface.

Apart from the above, a lens for image pickup is required to be corrected such that various aberrations are reduced by a sufficient amount that distortion of the image is not visually perceptible, and as required by the integration density of the imaging elements (also called "pixels"). An image for which various aberrations are satisfactorily corrected may be called a "satisfactory image".

The prior art discloses imaging lenses with a three-layer structure which are used in imaging devices using a solid-state imaging device such as a CCD or CMOS installed in portable computers, video telephones, or the like. These lenses secure a wide viewing angle, and are compact and lightweight.

First, an imaging lens capable of obtaining images with satisfactorily corrected aberration while securing a wide viewing angle has been disclosed as a first three-layer lens (see Japanese Unexamined Patent Application Publication No. 2001-075006, for example).

In this imaging lens, however, the refractive power of the three lenses, constituted by first, second, and third lenses, that are arrayed in succession from the object side, is positive in the first lens, negative in the second lens, and positive in the third lens. Hence this imaging lens has a constitution in which the distance (optical length) from the surface of the first lens on the object side to the image surface cannot be shortened. Further, in this imaging lens, a diaphragm is disposed on the object side surface of the first lens, and hence the effective diameter of the third lens cannot be reduced. As a result, a compact lens cannot be produced.

Imaging lenses in which aberration is satisfactorily corrected and a short focus is realized while securing a wide viewing angle have been respectively disclosed as second through fourth three-layer imaging lenses (see Japanese Unexamined Patent Application Publication No. 2003-149548, Japanese Unexamined Patent Application Publication No. 2002-221659, and Japanese Unexamined Patent Application Publication No. 2002-244030, for example).

However, similarly to the imaging lens described above, the refractive power of the three lenses of these imaging lenses, constituted by first, second, and third lenses arranged in succession from the object side, is positive in the first lens, negative in the second lens, and positive in the third lens. Hence, although these imaging lenses are set with a short combined focal length as an imaging lens, the back focus is long, and thus the optical length is too long. In addition, these imaging lenses use glass materials, and are therefore expensive.

An imaging lens which uses aspheric lenses and is reduced in size by appropriately setting power distribution and surface shape has been disclosed as a fifth three-layer imaging lens (for example, Japanese Unexamined Patent Application Publication No. 2003-149545).

However, the refractive power of the three lenses of this imaging lens, constituted by first, second, and third lenses arranged in succession from the object side, is negative in the first lens, positive in the second lens, and negative in the third lens. As a result, the imaging lens has a long optical length. In addition, the lenses of the imaging lens use glass materials, and are therefore expensive.

A lens in which a pair of meniscus lenses whose concave surfaces face each other are constituted by plastic lenses each having at least one aspheric surface, and in which the entire lens system has a three-layer structure, has been disclosed as a sixth three-layer imaging lens. This lens achieves compactness and low cost, and is capable of suppressing focus movement due to temperature change with ease (see Japanese Unexamined Patent Application Publication No. H10-301022, for example).

However, the refractive power of the three lenses in this imaging lens, which are arranged as first, second, and third lenses in succession from the object side, is weak in the first lens, weak in the second lens, and positive in the third lens. Hence the refractive power of the first lens and second lens in this imaging lens cannot be fully compensated for by the third lens alone. As a result, the back focus lengthens, causing an increase in the optical length. Furthermore, the third lens of this imaging lens uses a glass material, and hence cost reduction is incomplete.

A telephoto-type imaging lens in which the entire lens system is divided into front and rear groups, the front group having a positive refractive power and the rear group having a negative refractive power, has been disclosed as a seventh three-layer lens. This imaging lens has a short optical length and is low cost (see Japanese Unexamined Patent Application Publication No. H10-301021, for example).

However, the refractive power of the three lenses in this imaging lens, which are arranged as first, second, and third lenses in succession from the object side, is negative in the first lens, positive in the second lens, and negative in the third lens, and the distance between the second lens and third lens is wide. As a result, the optical length of the imaging lens is long, and the aperture of the third lens widens. This is unsuitable for installation in image input devices of portable telephones or personal computers, digital cameras, CCD cameras used for monitoring purposes, surveying devices, and so on.

It is therefore an object of the present invention to provide an imaging lens which is suitable for installation in a camera using a CCD or CMOS as an imaging device, which has a short optical length, and which is thus capable of obtaining satisfactory images.

A further object is to provide an imaging lens in which all of the (three) lenses constituting the imaging lens are made of plastic materials to thereby reduce cost and weight.

Here, "plastic materials" refers to high polymeric substances which may molded by being subjected to plastic

SUMMARY OF THE INVENTION

In order to achieve the objects described above, an imaging lens according to the present invention is constituted by arranging a first lens L1, an aperture diaphragm S1, a second lens L2, and a third lens L3 in succession from the object side to the image side. The first lens L1 is a resin lens having a positive refractive power and a meniscus shape in which the convex surface faces the object side. The second lens L2 is a resin lens having a positive refractive power and a meniscus shape in which the convex surface faces the image side. The third lens L3 is a resin lens having a negative refractivity.

Further, both surfaces of the first lens L1, both surfaces of the second lens L2, and both surfaces of the third lens L3 are constituted by aspheric surfaces.

According to constitutional examples of the invention, this imaging lens satisfies the following conditions (1) through (4).

$$0.24 < r1/r2 < 0.34 \quad (1)$$

$$0.08 < D2/f < 0.1 \quad (2)$$

$$0.24 < D3/f < 0.29 \quad (3)$$

$$1.0 < d/f < 1.5 \quad (4)$$

where f is the focal length of the entire lens system, r1 is the radius of curvature (axial curvature radius) of the object side surface of the first lens L1 in the vicinity of the optical axis, r2 is the radius of curvature (axial curvature radius) of the image side surface of the first lens L1 in the vicinity of the optical axis, D2 is the distance between the first lens L1 and second lens L2, D3 is the thickness at the center of the second lens L2, and d is the distance (in air) from the object side surface of the first lens L1 to the image surface.

Further, the first lens L1, second lens L2, and third lens L3 are preferably constituted by lenses formed from a material having an Abbe number between thirty and sixty. It is also preferable that the first lens L1, second lens L2, and third lens L3 be constituted by lenses formed using a cycloolefin plastic as a material.

The conditional expression (1) illustrated above is for determining the ratio r1/r2 of the axial curvature radius r1 of the first surface of the first lens L1 and the axial curvature radius r2 of the second surface of the first lens L1. If the ratio r1/r2 is larger than the lower limit provided by the conditional expression (1), then the back focus of the imaging lens is sufficient for inserting a component such as a cover glass or filter between the imaging lens and the image surface, and thus the back focus can be set within a range which does not impair the compactness of the device into which the imaging lens is to be installed. Moreover, distortion can be reduced sufficiently, and hence manufacturing of the first surface of the first lens L1 is facilitated.

If the ratio r1/r2 is smaller than the upper limit provided by the conditional expression (1), then the absolute distortion value is sufficiently small. Furthermore, in this case, distortion can be reduced sufficiently without increasing the number of aspheric surface components.

The conditional expression (2) illustrated above is for defining the allowable range of the distance D2 between the first lens L1 and second lens L2 by D2/f, which is normalized by the combined focal length f of the imaging lens. If D2/f is larger than the lower limit provided by the conditional expression (2), then the distance between the image side surface r2 of the first lens L1 and the object side surface r5 of the second lens L2 can be secured as a sufficient distance for inserting the aperture diaphragm S1. In other words, the outer forms of the first lens L1 and second lens L2 do not have to be reduced to the extent that manufacture becomes difficult, and a sufficient space for inserting the aperture diaphragm S1 can be ensured.

If D2/f is smaller than the upper limit provided by the conditional expression (2), then there is no need to increase the outer form of the first lens L1 and second lens L2, and hence the imaging lens can be made compact. Further, image surface distortion does not increase, and hence satisfactory images are obtained.

The conditional expression (3) illustrated above is for defining the allowable range of the thickness D3 at the center of the second lens L2 by D3/f, which is normalized by the combined focal length f of the imaging lens. If D3/f is larger than the lower limit provided by the conditional expression (3), then the thickness D3 at the center of the second lens L2 does not become too thin, and hence there is no need to reduce the thickness of the peripheral portion of the second lens L2 to the extent that manufacture becomes difficult. In other words, the aperture of the gate used for injecting molten resin into a die during injection molding of the resin lens can be sufficiently ensured, and hence the molten resin can be uniformly injected into the die with ease.

If D3/f is smaller than the upper limit provided by the conditional expression (3), then there is no need to increase the size of the lens system of the second lens L2, and thus the imaging lens can be made compact. Furthermore, image surface distortion does not increase, and hence satisfactory images are obtained. As a result, the imaging lens of the present invention, in which D3/f satisfies the conditional expression (3), enables molten resin to be injected into a die uniformly upon formation, and hence can be manufactured easily. Moreover, the imaging lens can be made compact.

The conditional expression (4) illustrated above is for defining the allowable range of the distance (in air) d from the object side surface of the first lens L1 to the image surface by d/f, which is normalized by the combined focal length f of the imaging lens. Here, the distance d from the object side surface of the first lens L1 to the image surface will also be described. The notation "distance (in air) d" signifies the distance from the object side surface of the first lens L1 to the image surface measured on the condition that no transparent object (a cover glass or the like) other than air be inserted between the object side surface of the first lens L1 and the image surface.

If d/f is larger than the lower limit provided by the conditional expression (4), then there is no need to reduce the thickness of the first lens L1, second lens L2, and third lens L3, and hence it does not become difficult for the resin to spread through the die during formation of the resin lenses. If d/f is smaller than the upper limit provided by the conditional expression (4), then the problem of the amount of light on the periphery of the lens being less than that in the central portion of the lens does not arise. Thus the amount of light on the periphery of the lenses can be increased without increasing the size of the outer forms of the first lens L1, second lens L2, and third lens L3, which are the constituent lenses of the imaging lens. As a result, the imaging lens can be made compact.

By providing a lens constitution which satisfies the four conditions in the conditional expressions (1) to (4) illustrated above, the problems in conventional imaging lenses can be solved, and a compact imaging lens which is small yet capable of obtaining satisfactory images can be provided.

Further, by constituting the first lens L1, second lens L2, and third lens L3 by lenses formed from a material having an Abbe number between thirty and sixty, satisfactory images are obtained easily. Further, if the first lens L1, second lens L2, and third lens L3 are formed using a cycloolefin plastic as a material, since the Abbe number of this material is 56.2, the lenses can be formed from a material having an Abbe number within the aforementioned range of thirty to sixty.

According to the imaging lens of the present invention, lenses formed from a material having an Abbe number within a range of thirty to sixty can be used, and hence the material is not limited to a specific plastic material. As long as the plastic material has an Abbe number within a range of thirty to sixty, any plastic material may be used.

Further, it is well known that cycloolefin plastic materials are suitable for forming lenses according to injection molding methods. Injection molding methods are already well-established as manufacturing techniques in the formation of lenses. Moreover, cycloolefin plastic materials have a record of usage in other lens systems than the imaging lens of the present invention, and hence if a cycloolefin plastic material is used, an imaging lens with a high degree of reliability can be manufactured.

BRIEF DESCRIPTION OF THE DRAWINGS

The foregoing and other objects, features and advantages of the present invention will be better understood from the following description taken in connection with the accompanying drawings, in which.

DESCRIPTION OF THE PREFERRED EMBODIMENTS

Figure 1:
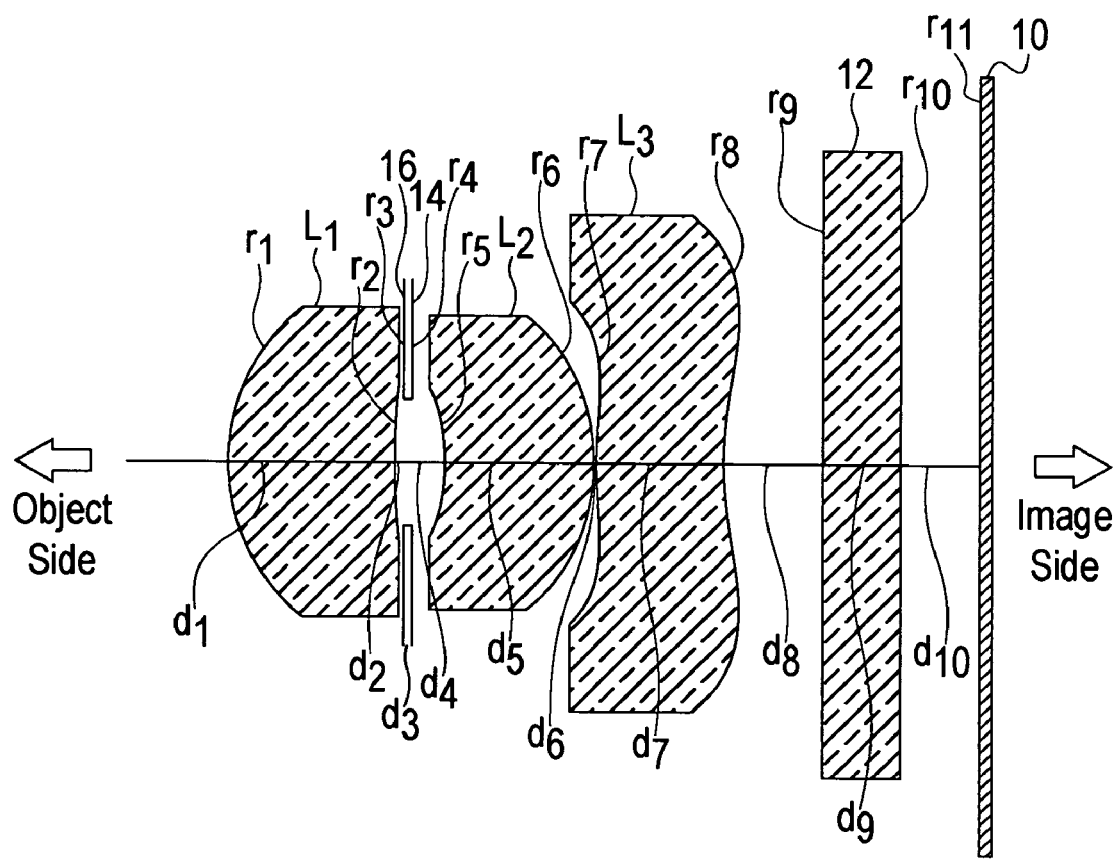
FIG. 1 is a sectional view of an imaging lens according to the present invention.

Embodiments of the present invention will be described below with reference to the drawings. Note that in the drawings, the form, magnitude, and positional relationships of each constitutional element are merely illustrated schematically in order to facilitate understanding of the invention, and the numerical conditions and other conditions to be described below are merely preferred examples thereof. Accordingly, the present invention is in no way limited to or by the embodiments of the invention.

FIG. 1 is a constitutional diagram of an imaging lens according to the present invention. The reference symbols defined in FIG. 1, which indicate surface numbers, inter-surface distances, and so on, are also used in FIGS. 2, 6, 10, and 14.

Counting from the object side, first, second, and third lenses are indicated by the reference symbols L1, L2, and L3 respectively. An imaging device constituting the image surface is indicated by the numeral 10, a cover glass separating the image surface and lens system is indicated by the numeral 12, and an aperture diaphragm is indicated by the symbol S1. The two surfaces of the aperture diaphragm S1 are indicated respectively by the numerals 14 and 16. The symbols r1 and r2 are used without causing confusion as both variables representing axial curvature radius values and as symbols identifying lens surfaces (for example, r1 is used to represent the object side surface of the first lens, and so on).

Parameters shown in the drawing such as ri (where i=1, 2, 3, ..., 11) and di (where i=1, 2, 3, ..., 10) are provided as specific numerical values in the following Tables 1 through 4. The suffix i corresponds to the surface numbers of each lens, the lens thickness, the inter-lens distance, or similar, in succession from the object side to the image surface side.

More specifically:

ri is the axial curvature radius of the $i^{th}$ surface;

di is the distance from the $i^{th}$ surface to the $i+1^{th}$ surface;

Ni is the refractivity of the lens medium constituted by the $i^{th}$ surface and the $i+1^{th}$ surface; and vi is the Abbe number of the lens medium constituted by the $i^{th}$ surface and the $i+1^{th}$ surface.

The optical length d is a value obtained by adding together the distances from d1 through d7 and further adding the back focus bf thereto. The back focus bf is the distance from the image side surface of the third lens L3 to the image surface on the optical axis. It is assumed that the back focus bf is measured with the cover glass 12 that is inserted between the third lens L3 and the image surface removed. More specifically, since the cover glass has a refractivity of more than one, the geometrical distance from the image side surface of the third lens L3 to the image surface is longer when the cover glass is inserted than when the cover glass is removed. The extent to which the distance increases is determined by the refractivity and thickness of the inserted cover glass.

Hence, in order to define the back focus bf as a value which is unique to the imaging lens and does not depend on the presence or absence of a cover glass, a value measured with the cover glass removed is used. The distance D2 between the first lens L1 and second lens L2 is defined as D2=d2+d3+d4.

Aspheric surface data are illustrated together with the surface numbers in the respective columns of Tables 1 through 4. The two surfaces r3 and r4 of the aperture diaphragm S1, the two surfaces r9, r10 of the cover glass, and r11 are flat, and hence the curvature radius thereof is displayed as ∞.

The aspheric surfaces used in the present invention are obtained according to the following equation.

$$Z = ch^2/[1+[1-(1+k)c^2h^2]+1/2]+A_0h^4+B_0h^6+C_0h^8+D_0h^{10}$$

where

Z is the depth from the tangent plane at the surface vertex, c is the curvature of the surface in the vicinity of the optical axis, h is the height from the optical axis, k is the conic constant, $A_0$ is the fourth-order aspheric coefficient, $B_0$ is the sixth-order aspheric coefficient, $C_0$ is the eighth-order aspheric coefficient, and $D_0$ is the tenth-order aspheric coefficient.

In the display of the numerical values indicating the aspheric coefficients in each of the Tables 1 through 4 in this specification, an index display, for example, "e−1", signifies "$10^{-1}$". Further, the value illustrated as the focal length f is the combined focal length of the lens system constituted by the first and second lenses.

First through fourth embodiments will now be described with reference to FIGS. 2 through 17. FIGS. 2, 6, 10, and 14 are schematic diagrams showing lens constitutions. FIGS. 3, 7, 11, and 15 show distortion curves, FIGS. 4, 8, 12, and 16 show astigmatism curves, and FIGS. 5, 9, 13, and 17 show chromatic/spherical aberration curves.

The distortion curve shows aberration (the abscissa shows as a percentage the degree to which the tangent condition is unsatisfied) in relation to the distance from the optical axis (the ordinate shows a percentage with the maximum distance from the optical axis on the image surface set to 100). Similarly to the distortion curve, the astigmatism curve shows the amount of aberration in relation to the distance from the optical axis along the abscissa (mm units). The astigmatism curve also shows the aberration (mm units) on the meridional plane and the sagittal plane. The chromatic/spherical aberration curve shows the aberration (mm units) along the abscissa in relation to the distance of incidence h (F number) on the ordinate.

The chromatic/spherical aberration curve also shows aberration values for the C line (light with wavelength of 656.3 nm), the d line (light with wavelength of 587.6 nm), the e line (light with wavelength of 546.1 nm), the F line (light with wavelength of 486.1 nm), and the g line (light with wavelength of 435.8 nm). The refractivity is the refractivity on the d line (light with wavelength of 587.6 nm).

The curvature radius (mm units), lens surface distance (mm units), refractivity of the lens material, Abbe number of the lens material, focal length, numerical aperture, and aspheric coefficient of the lenses constituting the first through fourth embodiments are listed below.

TABLE 1

First Embodiment

| Radius of Curvature ($r_i$) | Distance ($d_i$) | Refractivity ($N_i$) | Abbe Number($v_i$) | K | $A_0$ | $B_0$ | $C_0$ | $D_0$ |
|---|---|---|---|---|---|---|---|---|
| r1 = 1.34 | d1 = 1.0500 | N1 = 1.525 | v1 = 56.2 | 0 | 0.300e−1 | −0.200e−1 | 0.360e−1 | 0 |
| r2 = 4.61 | d2 = 0.0600 | | | 0 | −0.260e−1 | 0.660 | −0.200e+1 | 0 |
| r3 = ∞ | d3 = 0.0500 | | | 0 | | | | 0 |
| r4 = ∞ | d4 = 0.2100 | | | 0 | | | | 0 |
| r5 = −1.35 | d5 = 1.0000 | N5 = 1.525 | v5 = 56.2 | 0 | 0.140e−1 | −0.100e+1 | 0.265e+1 | 0 |
| r6 = −1.54 | d6 = 0.0200 | | | 0 | −0.100 | −0.230 | 0.230 | 0 |
| r7 = 2.95 | d7 = 0.7994 | N7 = 1.525 | v7 = 56.2 | 0 | −0.280 | −0.540e−1 | 0.330e−1 | 0 |
| r8 = 2.17 | d8 = 0.5990 | | | 0 | −0.150 | 0.100e−1 | −0.300e−2 | 0 |
| r9 = ∞ | d9 = 0.5000 | Cover Glass | | 0 | | | | 0 |
| r10 = ∞ | d10 = 0.5000 | | | 0 | | | | 0 |
| r11 = ∞ | | | | 0 | | | | 0 |

Focal Length f = 3.656 mm
Numerical Aperture Fno = 3.00

TABLE 2

Second Embodiment

| Radius of Curvature ($r_i$) | Distance ($d_i$) | Refractivity ($N_i$) | Abbe Number($v_i$) | K | $A_0$ | $B_0$ | $C_0$ | $D_0$ |
|---|---|---|---|---|---|---|---|---|
| r1 = 1.36 | d1 = 1.0700 | N1 = 1.525 | v1 = 56.2 | 0 | 0.230e−1 | −0.150e−1 | 0.330e−1 | 0 |
| r2 = 4.68 | d2 = 0.0600 | | | 0 | −0.240e−1 | 0.720 | −0.210e+1 | 0 |
| r3 = ∞ | d3 = 0.0500 | | | 0 | | | | 0 |
| r4 = ∞ | d4 = 0.2100 | | | 0 | | | | 0 |
| r5 = −1.37 | d5 = 0.9500 | N5 = 1.525 | v5 = 56.2 | 0 | 0.330e−1 | −0.830 | 0.190e+1 | 0 |
| r6 = −1.56 | d6 = 0.0200 | | | 0 | −0.160 | −0.110 | 0.160 | 0 |
| r7 = 3.00 | d7 = 0.8100 | N7 = 1.525 | v7 = 56.2 | 0 | −0.310 | −0.420e−3 | 0.890e−2 | 0 |

TABLE 2-continued

Second Embodiment

| Radius of Curvature ($r_i$) | Distance ($d_i$) | Refractivity ($N_i$) | Abbe Number($v_i$) | K | $A_o$ | $B_o$ | $C_o$ | $D_o$ |
|---|---|---|---|---|---|---|---|---|
| r8 = 2.20 | d8 = 0.6238 | | | 0 | −0.148 | 0.121e−1 | −0.280e−2 | 0 |
| r9 = ∞ | d9 = 0.5000 | Cover Glass | | 0 | | | | 0 |
| r10 = ∞ | d10 = 0.5000 | | | 0 | | | | 0 |
| r11 = ∞ | | | | 0 | | | | 0 |

Focal Length f = 3.697 mm
Numerical Aperture Fno = 3.20

TABLE 3

Third Embodiment

| Radius of Curvature ($r_i$) | Distance ($d_i$) | Refractivity ($N_i$) | Abbe Number($v_i$) | K | $A_o$ | $B_o$ | $C_o$ | $D_o$ |
|---|---|---|---|---|---|---|---|---|
| r1 = 2.00 | d1 = 1.5800 | N1 = 1.525 | v1 = 56.2 | 0 | 0.360e−2 | 0.630e−3 | 0.780e−3 | 0 |
| r2 = 6.92 | d2 = 0.0900 | | | 0 | −0.190e−1 | 0.920e−1 | −0.130 | 0 |
| r3 = ∞ | d3 = 0.0500 | | | 0 | | | | 0 |
| r4 = ∞ | d4 = 0.3400 | | | 0 | | | | 0 |
| r5 = −2.02 | d5 = 1.4700 | N5 = 1.525 | v5 = 56.2 | 0 | −0.380e−2 | −0.850e−1 | 0.100e−1 | 0 |
| r6 = −2.30 | d6 = 0.0300 | | | 0 | −0.350e−1 | −0.130e−1 | 0.650e−2 | 0 |
| r7 = 4.42 | d7 = 1.2000 | N7 = 1.525 | v7 = 56.2 | 0 | −0.800e−1 | −0.340e−3 | 0.127e−2 | 0 |
| r8 = 3.25 | d8 = 0.7659 | | | 0 | −0.430e−1 | 0.170e−2 | −0.110e−3 | 0 |
| r9 = ∞ | d9 = 0.5000 | Cover Glass | | 0 | | | | 0 |
| r10 = ∞ | d10 = 1.0000 | | | 0 | | | | 0 |
| r11 = ∞ | | | | 0 | | | | 0 |

Focal Length f = 5.428 mm
Numerical Aperture Fno = 3.20

TABLE 4

Fourth Embodiment

| Radius of Curvature ($r_i$) | Distance ($d_i$) | Refractivity ($N_i$) | Abbe Number($v_i$) | K | $A_o$ | $B_o$ | $C_o$ | $D_o$ |
|---|---|---|---|---|---|---|---|---|
| r1 = 2.40 | d1 = 1.8900 | N1 = 1.525 | v1 = 56.2 | 0 | 0.270e−2 | 0.390e−4 | 0.240e−3 | 0 |
| r2 = 8.30 | d2 = 0.1100 | | | 0 | −0.100e−1 | 0.340e−1 | −0.380e−1 | 0 |
| r3 = ∞ | d3 = 0.0500 | | | 0 | | | | 0 |
| r4 = ∞ | d4 = 0.4200 | | | 0 | | | | 0 |
| r5 = −2.43 | d5 = 1.7600 | N5 = 1.525 | v5 = 56.2 | 0 | −0.220e−2 | −0.430e−1 | 0.140e−1 | 0 |
| r6 = −2.77 | d6 = 0.0360 | | | 0 | −0.240e−1 | −0.710e−2 | 0.250e−2 | 0 |
| r7 = 5.30 | d7 = 1.4400 | N7 = 1.525 | v7 = 56.2 | 0 | −0.560e−1 | 0.110e−2 | 0.120e−3 | 0 |
| r8 = 3.90 | d8 = 1.1894 | | | 0 | −0.290e−1 | 0.130e−2 | −0.890e−4 | 0 |
| r9 = ∞ | d9 = 0.5000 | Cover Glass | | 0 | | | | 0 |
| r10 = ∞ | d10 = 1.0000 | | | 0 | | | | 0 |
| r11 = ∞ | | | | 0 | | | | 0 |

Focal Length f = 6.520 mm
Numerical Aperture Fno = 3.30

The features of each of the embodiments are described below. In all of the first through fourth embodiments, ZEONEX 480R ("ZEONEX" is a registered trademark, and 480R is a product number of Nippon Zeon Co., Ltd.; this will be referred to simply as "ZEONEX" below), which is a cycloolefin plastic, is used as the material for the first lens L1, second lens L2, and third lens L3.

Both surfaces of the first lens L1, and both surfaces of the second lens L2 and third lens L3 respectively, are aspheric surfaces. Hence in each of the embodiments and comparative examples, the number of aspheric surfaces is six.

The Abbe number of the ZEONEX 480R which is the material of the first lens L1 and second lens L2 and third lens L3 is 56.2 (the refractivity on the d line is 1.525).

It was learned through simulation that if the Abbe number of the material of the lenses is within a range of thirty to sixty, substantially no discrepancies appear in lens performance qualities such as aberration. In other words, it was learned that as long as the Abbe number is a value within this range, the object of the present invention, i.e. the satisfactory correction of aberration in an imaging lens in comparison to aberration correction in a conventional imaging lens, can be realized.

A filter with a thickness of 0.5 mm is inserted between the lens system and the image surface in each of the first through fourth embodiments. Glass (with a refractivity on the d line of 1.52) is used as the material for this filter. The various types of aberration to be described below are calculated on the premise that the filter is present.

First Embodiment (A) The focal length f of the entire lens system is f=3.656 mm.
(B) The object side curvature radius r1 of the first lens L1 is r1=1.34 mm.
(C) The image side curvature radius r2 of the first lens L1 is r2=4.61 mm.
(D) The back focus bf is bf=1.432 mm.
(E) The distance in air from the object side surface of the first lens L1 to the image surface, or in other words the optical length d, is d=4.621 mm.
(F) The distance D2 between the first lens L1 and second lens L2 is D2=0.32 mm.
(G) The thickness D3 at the center of the second lens L2 is D3=d5=1.00 mm.
(H) The focal length f1 of the first lens L1 is f1=3.24 mm.
(I) The focal length f2 of the second lens L2 is f2=25.67 mm.
(J) The focal length f3 of the third lens L3 is f3=−24.15 mm.
Hence $$r1/r2 = 1.34/4.61 = 0.2907 \quad (1)$$

$$D2/f = 0.32/3.656 = 0.0875 \quad (2)$$

$$D3/f = 1.00/3.656 = 0.2735, \text{ and} \quad (3)$$

$$d/f = 4.621/3.656 = 1.2639. \quad (4)$$

Thus the lens system of the first embodiment satisfies all of the following conditional expressions (1) through (4).

$$0.24 < r1/r2 < 0.34 \quad (1)$$

$$0.08 < D2/f < 0.1 \quad (2)$$

$$0.24 < D3/f < 0.29 \quad (3)$$

$$1.0 < d/f < 1.5 \quad (4)$$

Hereafter, the term "conditional expressions" will be used to indicate these four expressions (1) through (4).

As shown in Table 1, the aperture diaphragm S1 is provided in a position 0.06 mm (d2=0.06 mm) rearward of the second surface (the image side surface) of the first lens. The numerical aperture (F number) is 3.0, and the combined focal length f is 3.656 mm.

Figure 2:
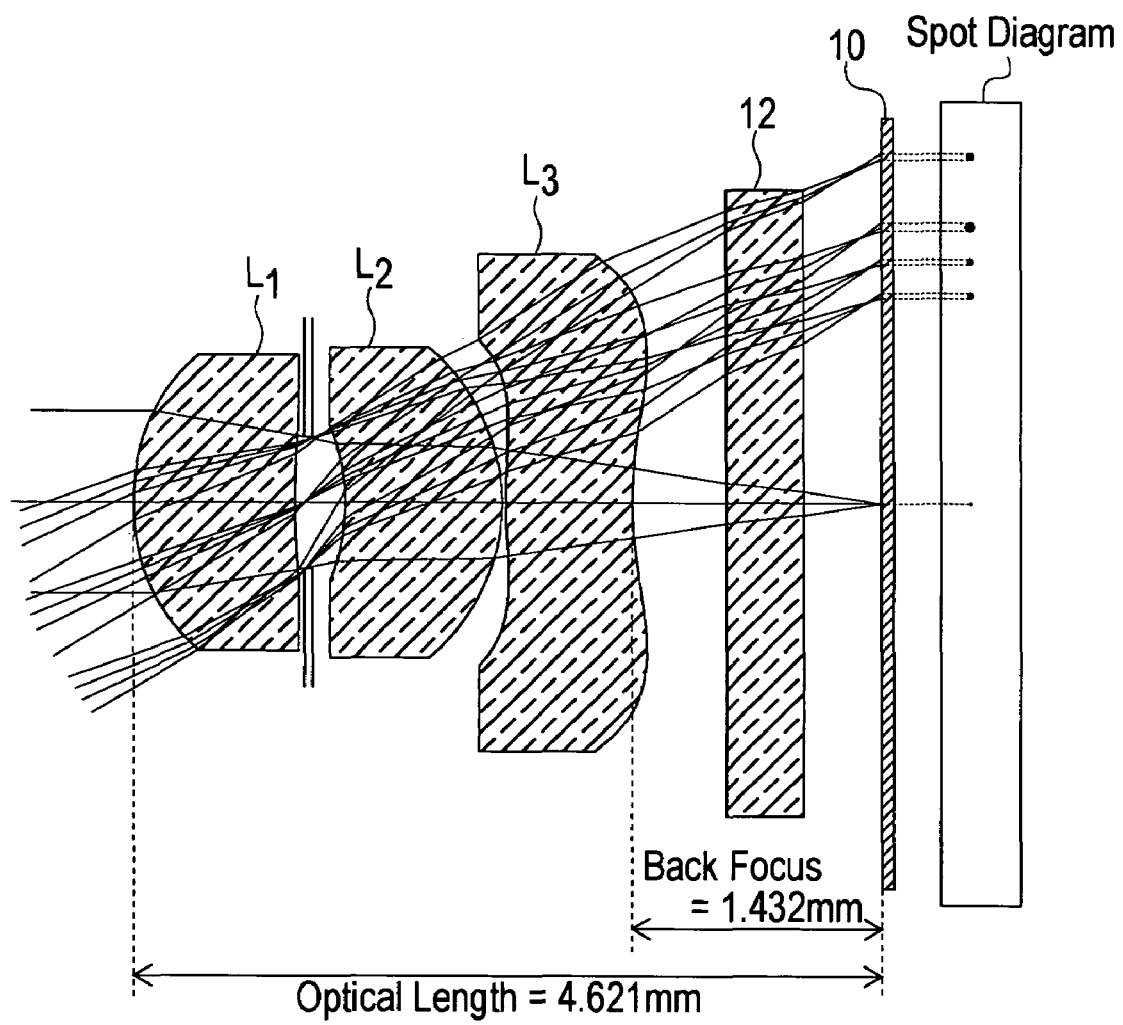
FIG. 2 is a sectional view of an imaging lens of a first embodiment.

FIG. 2 shows a sectional view of the imaging lens of the first embodiment.

The optical length is 4.621 mm, and hence this value is held within 9 mm. The back focus is 1.432 mm, and hence a sufficient length is secured.

Figure 3:
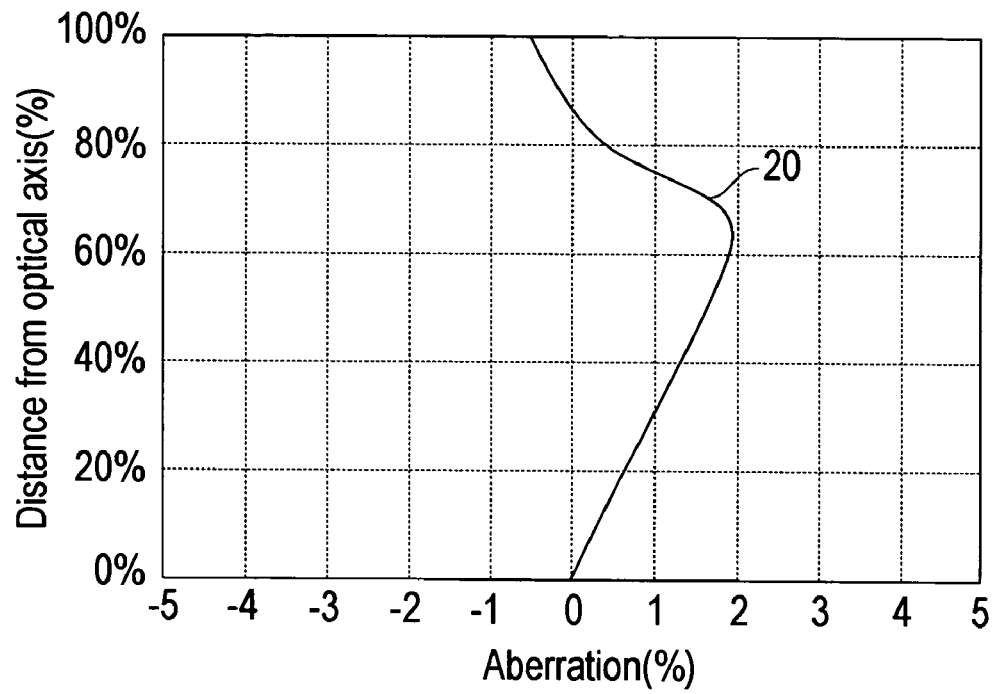
FIG. 3 is a view of distortion in the imaging lens of the first embodiment.
Figure 4:
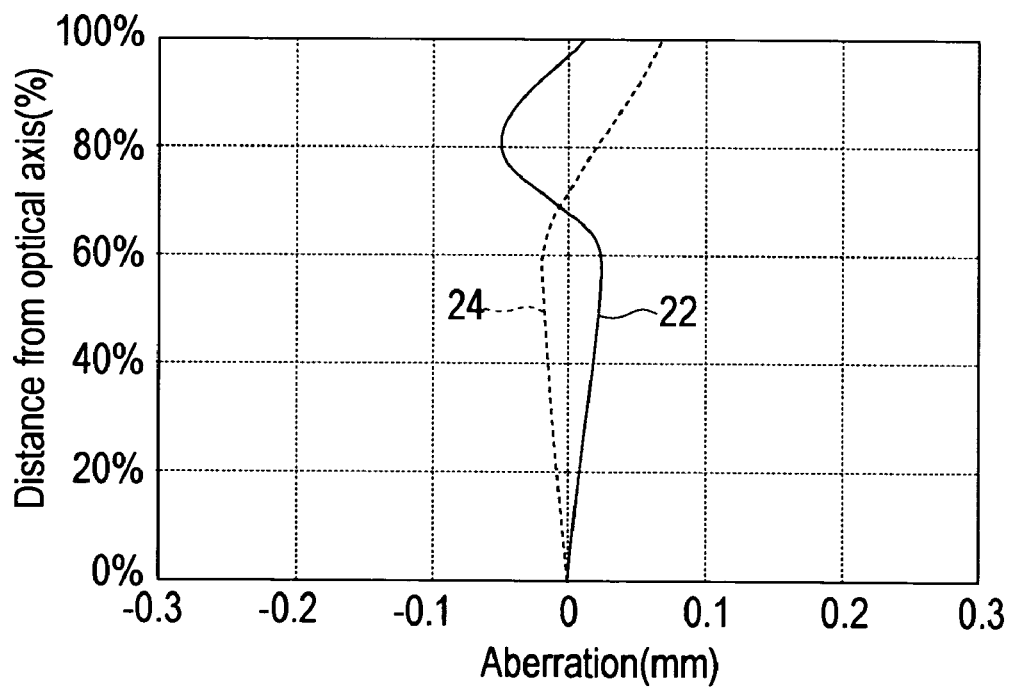
FIG. 4 is a view of astigmatism in the imaging lens of the first embodiment.
Figure 5:
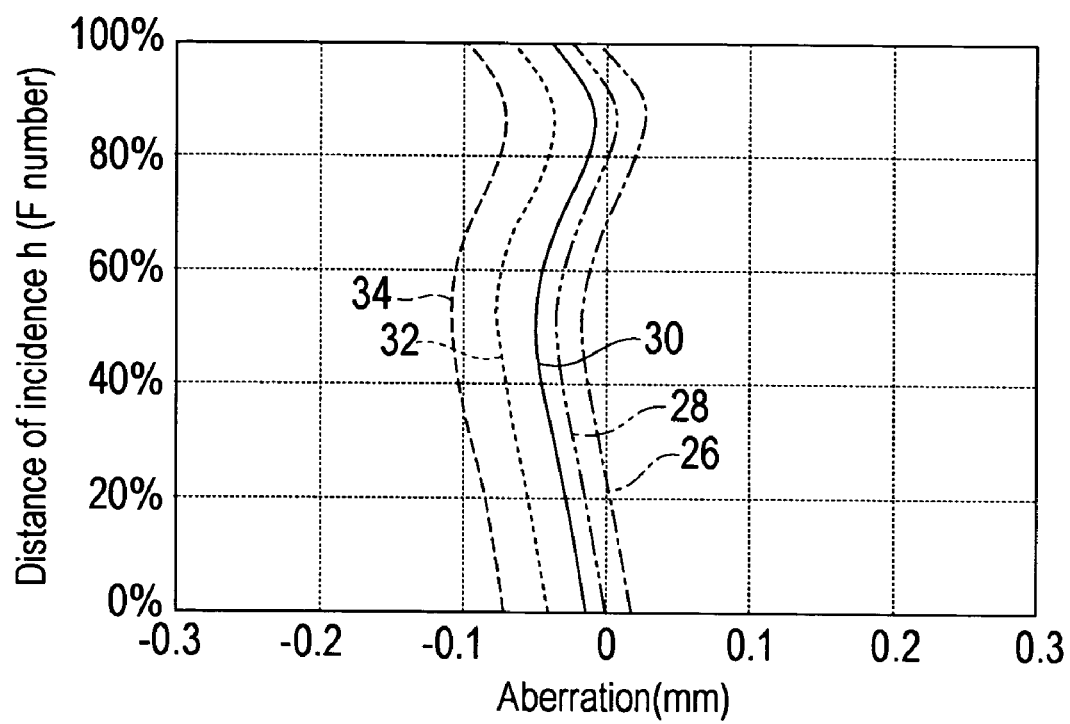
FIG. 5 is a view of chromatic/spherical aberration in the imaging lens of the first embodiment.

The distortion curve 20 shown in FIG. 3, the astigmatism curve (the aberration curve 22 relating to the meridional plane and the aberration curve 24 relating to the sagittal plane) shown in FIG. 4, and the chromatic/spherical aberration curve (the aberration curve 26 relating to the C line, the aberration curve 28 relating to the d line, the aberration curve 30 relating to the e line, the aberration curve 32 relating to the F line, and the aberration curve 34 relating to the g line) shown in FIG. 5 are respectively illustrated by graphs.

The ordinate of the aberration curves in FIGS. 3 and 4 illustrate the image height as a percentage of the distance from the optical axis. In FIGS. 3 and 4, 100%, 80%, 70%, and 60% correspond to 2.240 mm, 1.792 mm, 1.567 mm, and 1.344 mm respectively. The ordinate of the aberration curve in FIG. 5 indicates the distance of incidence h (F number), corresponding at its maximum to F3.0. The abscissa in FIG. 5 shows the magnitude of the aberration.

As regards distortion, the absolute value of the amount of aberration reaches a maximum of 1.92% in an image height position of 60% (image height 1.344 mm), and hence within a range of image height 2.240 mm and below, the absolute value of the aberration amount is held within 1.92%.

As for astigmatism, the absolute value of the aberration amount on the saggital plane reaches a maximum of 0.0682 mm in an image height position of 100% (image height 2.240 mm), and hence within a range of image height 2.240 mm and below, the absolute value of the aberration amount is held within 0.0682 mm.

As for chromatic/spherical aberration, the absolute value of the aberration curve 34 relating to the g line reaches a maximum of 0.11 mm at a distance of incidence h of 50%, and hence the absolute value of the aberration amount is held within 0.11 mm.

Second Embodiment (A) The focal length f of the entire lens system is f=3.697 mm.
(B) The object side curvature radius r1 of the first lens L1 is r1=1.36 mm.
(C) The image side curvature radius r2 of the first lens L1 is r2=4.68 mm.
(D) The back focus bf is bf=1.457 mm.
(E) The distance in air from the object side surface of the first lens L1 to the image surface, or in other words the optical length d, is d=4.627 mm.
(F) The distance D2 between the first lens L1 and second lens L2 is D2=0.32 mm.
(G) The thickness D3 at the center of the second lens L2 is D3=d5=0.95 mm.
(H) The focal length f1 of the first lens L1 is f1=3.29 mm.
(I) The focal length f2 of the second lens L2 is f2=29.7 mm.
(J) The focal length f3 of the third lens L3 is f3=−24.12 mm.
Hence $$r1/r2 = 1.36/4.68 = 0.2906 \quad (1)$$

$$D2/f = 0.32/3.697 = 0.0866 \quad (2)$$

$$D3/f = 0.95/3.697 = 0.257, \text{ and} \quad (3)$$

$$d/f = 4.627/3.697 = 1.2516. \quad (4)$$

Thus the lens system of the second embodiment satisfies all of the following conditional expressions (1) through (4).

$$0.24 < r1/r2 < 0.34 \quad (1)$$

$$0.08 < D2/f < 0.1 \quad (2)$$

$$0.24 < D3/f < 0.29 \quad (3)$$

$$1.0 < d/f < 1.5 \quad (4)$$

As shown in Table 2, the aperture diaphragm S1 is provided in a position 0.06 mm (d2=0.06 mm) rearward of the second surface (the image side surface) of the first lens. The numerical aperture (F number) is 3.2, and the combined focal length f is 3.697 mm.

Figure 6:
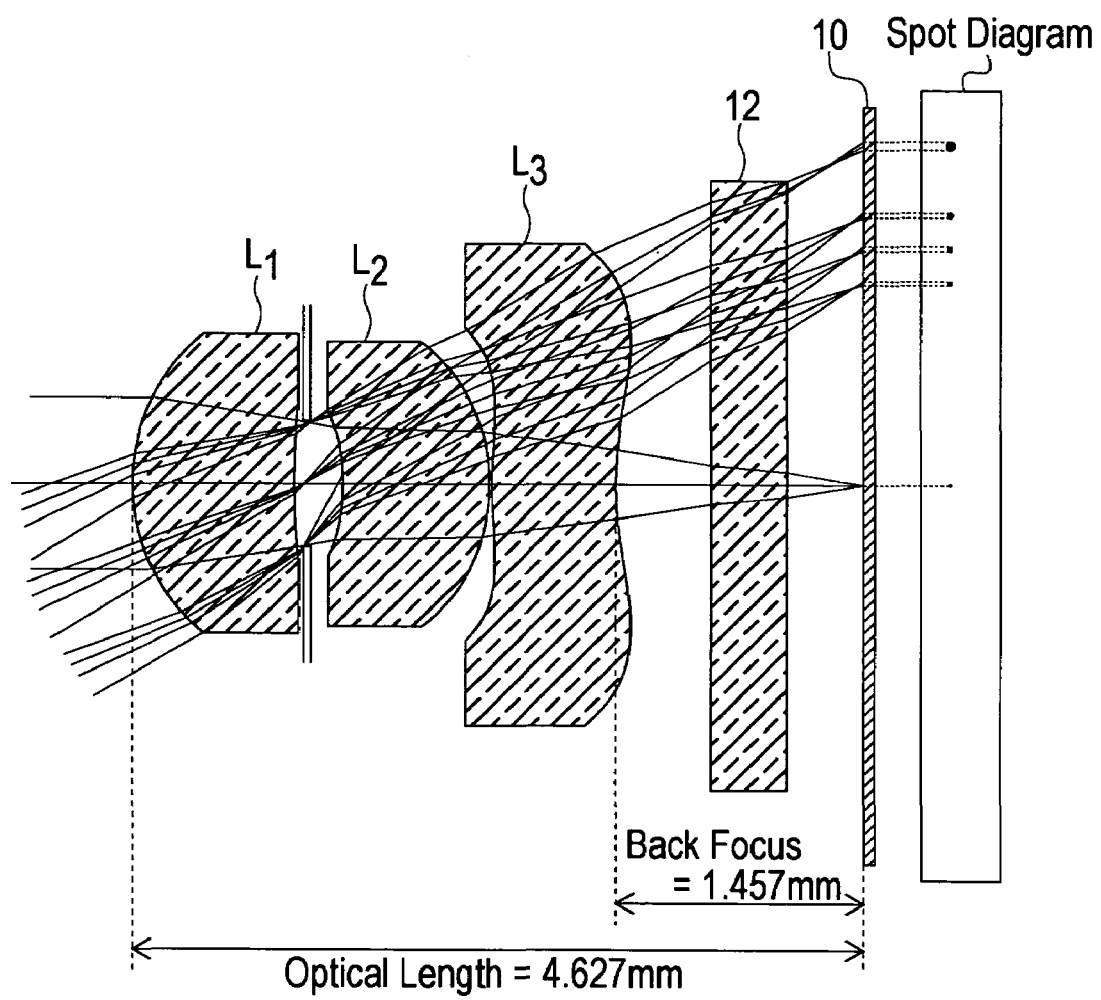
FIG. 6 is a sectional view of an imaging lens of a second embodiment.

FIG. 6 shows a sectional view of the imaging lens of the second embodiment.

The optical length is 4.627 mm, and hence this value is held within 9 mm. The back focus is 1.457 mm, and hence a sufficient length is secured.

Figure 7:
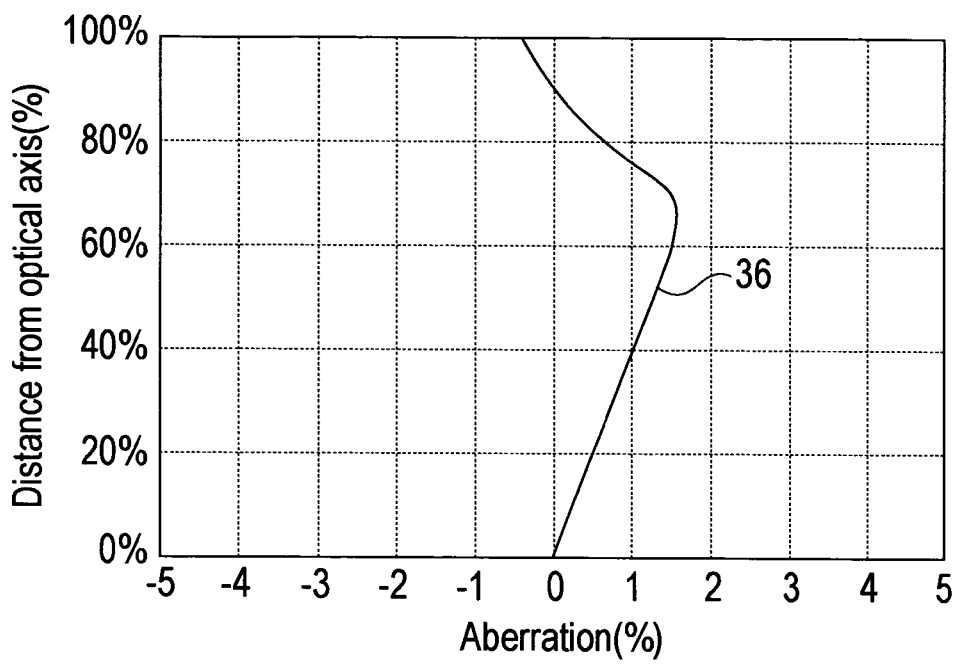
FIG. 7 is a view of distortion in the imaging lens of the second embodiment.
Figure 8:
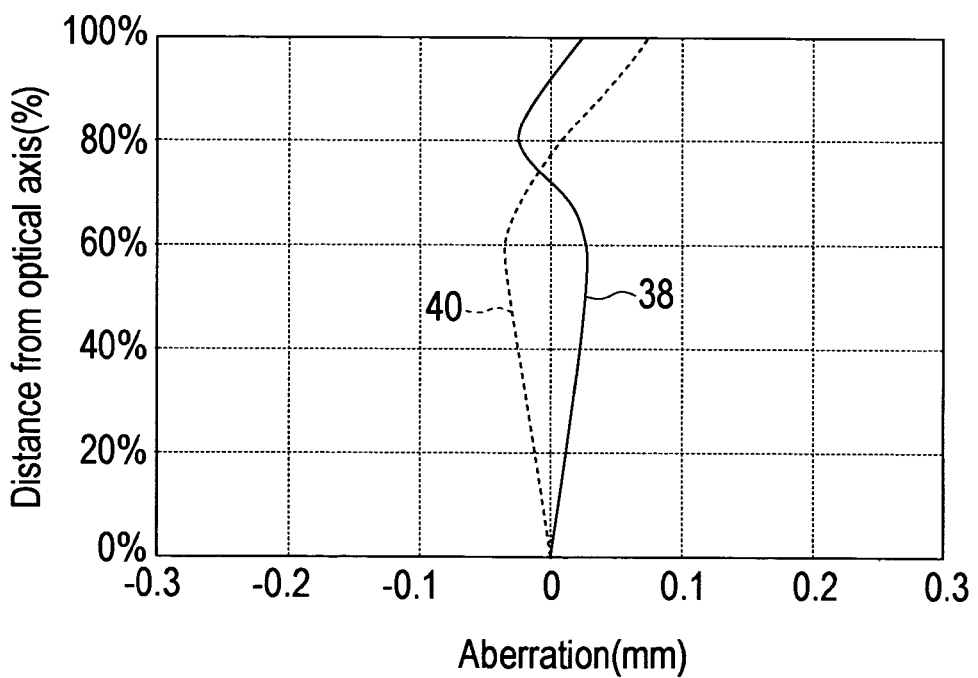
FIG. 8 is a view of astigmatism in the imaging lens of the second embodiment.
Figure 9:
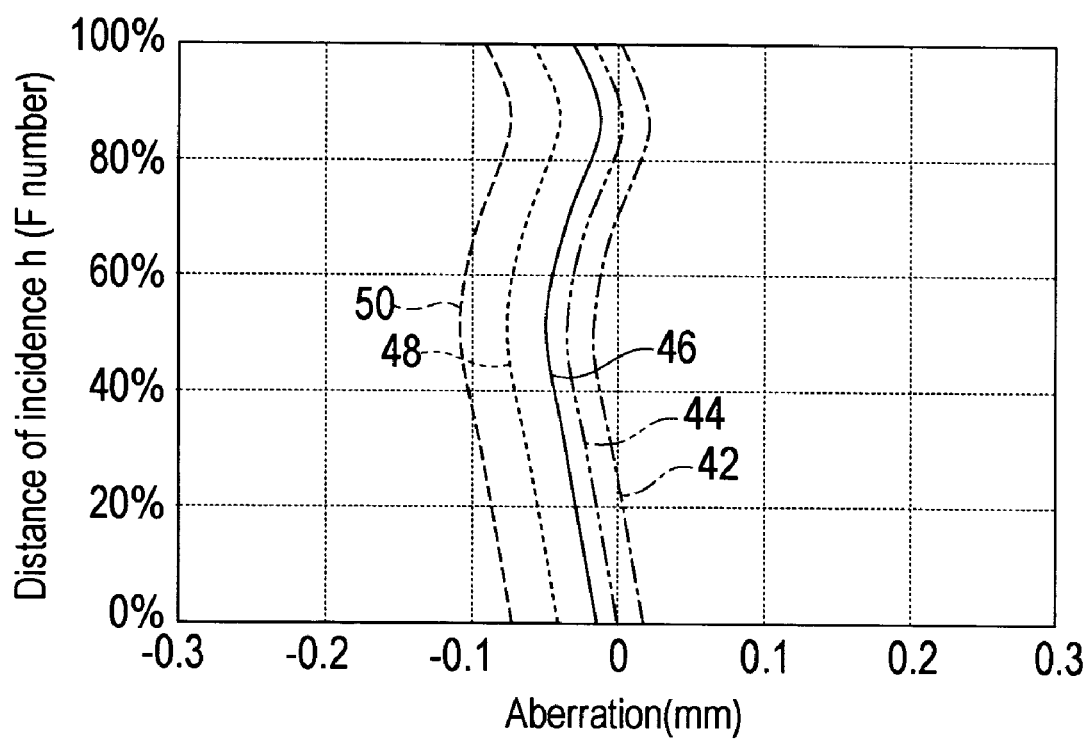
FIG. 9 is a view of chromatic/spherical aberration in the imaging lens of the second embodiment.

The distortion curve 36 shown in FIG. 7, the astigmatism curve (the aberration curve 38 relating to the meridional plane and the aberration curve 40 relating to the sagittal plane) shown in FIG. 8, and the chromatic/spherical aberration curve (the aberration curve 42 relating to the C line, the aberration curve 44 relating to the d line, the aberration curve 46 relating to the e line, the aberration curve 48 relating to the F line, and the aberration curve 50 relating to the g line) shown in FIG. 9 are respectively illustrated by graphs.

The ordinate of the aberration curves in FIGS. 7 and 8 illustrate the image height as a percentage of the distance from the optical axis. In FIGS. 7 and 8, 100%, 80%, 70%, and 60% correspond to 2.240 mm, 1.792 mm, 1.567 mm, and 1.344 mm respectively. The ordinate of the aberration curve in FIG. 9 indicates the distance of incidence h (F number), corresponding at its maximum to F3.2. The abscissa in FIG. 9 shows the magnitude of the aberration.

As regards distortion, the absolute value of the amount of aberration reaches a maximum of 1.52% in an image height position of 60% (image height 1.344 mm), and hence within a range of image height 2.240 mm and below, the absolute value of the aberration amount is held within 1.52%.

As for astigmatism, the absolute value of the aberration amount on the saggital plane reaches a maximum of 0.0744 mm in an image height position of 100% (image height 2.240 mm), and hence within a range of image height 2.240 mm and below, the absolute value of the aberration amount is held within 0.0744 mm.

As for chromatic/spherical aberration, the absolute value of the aberration curve 50 relating to the g line reaches a maximum of 0.11 mm at a distance of incidence h of 50%, and hence the absolute value of the aberration amount is held within 0.11 mm.

Third Embodiment (A) The focal length f of the entire lens system is f=5.428 mm.
(B) The object side curvature radius r1 of the first lens L1 is r1=2.00 mm.
(C) The image side curvature radius r2 of the first lens L1 is r2=6.92 mm.
(D) The back focus bf is bf=2.099 mm.
(E) The distance in air from the object side surface of the first lens L1 to the image surface, or in other words the optical length d, is d=6.859 mm.
(F) The distance D2 between the first lens L1 and second lens L2 is D2=0.48 mm.
(G) The thickness D3 at the center of the second lens L2 is D3=d5=1.47 mm.
(H) The focal length f1 of the first lens L1 is f1=4.82 mm.
(I) The focal length f2 of the second lens L2 is f2=39.15 mm.
(J) The focal length f3 of the third lens L3 is f3=−36.15 mm.

Hence $$r1/r2=2.00/6.92=0.289 \quad (1)$$

$$D2/f=0.48/5.428=0.0884 \quad (2)$$

$$D3/f=1.47/5.428=0.2708, \text{ and} \quad (3)$$

$$d/f=6.859/5.428=1.2636. \quad (4)$$

Thus the lens system of the third embodiment satisfies all of the following conditional expressions (1) through (4).

$$0.24<r1/r2<0.34 \quad (1)$$

$$0.08<D2/f<0.1 \quad (2)$$

$$0.24<D3/f<0.29 \quad (3)$$

$$1.0<d/f<1.5 \quad (4)$$

As shown in Table 3, the aperture diaphragm S1 is provided in a position 0.09 mm (d2=0.09 mm) rearward of the second surface (the image side surface) of the first lens. The numerical aperture (F number) is 3.2, and the combined focal length f is 5.428 mm.

Figure 10:
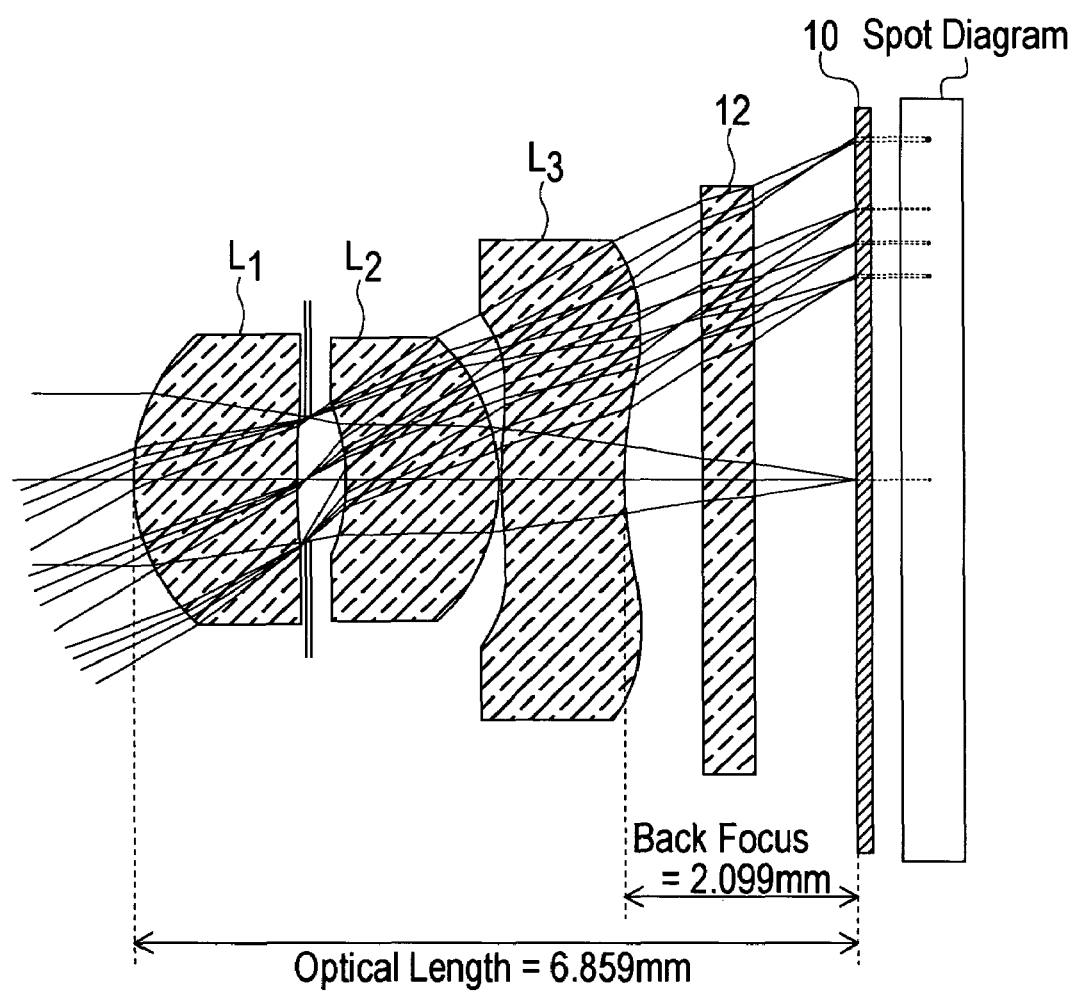
FIG. 10 is a sectional view of an imaging lens of a third embodiment.

FIG. 10 shows a sectional view of the imaging lens of the third embodiment.

The optical length is 6.859 mm, and hence this value is held within 9 mm. The back focus is 2.099 mm, and hence a sufficient length is secured.

Figure 11:
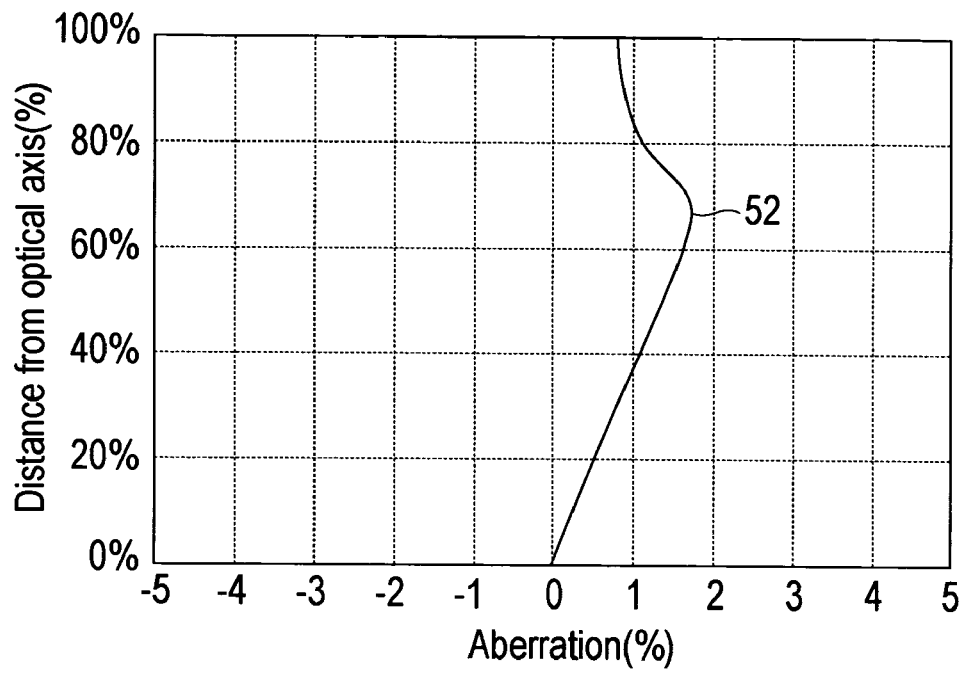
FIG. 11 is a view of distortion in the imaging lens of the third embodiment.
Figure 12:
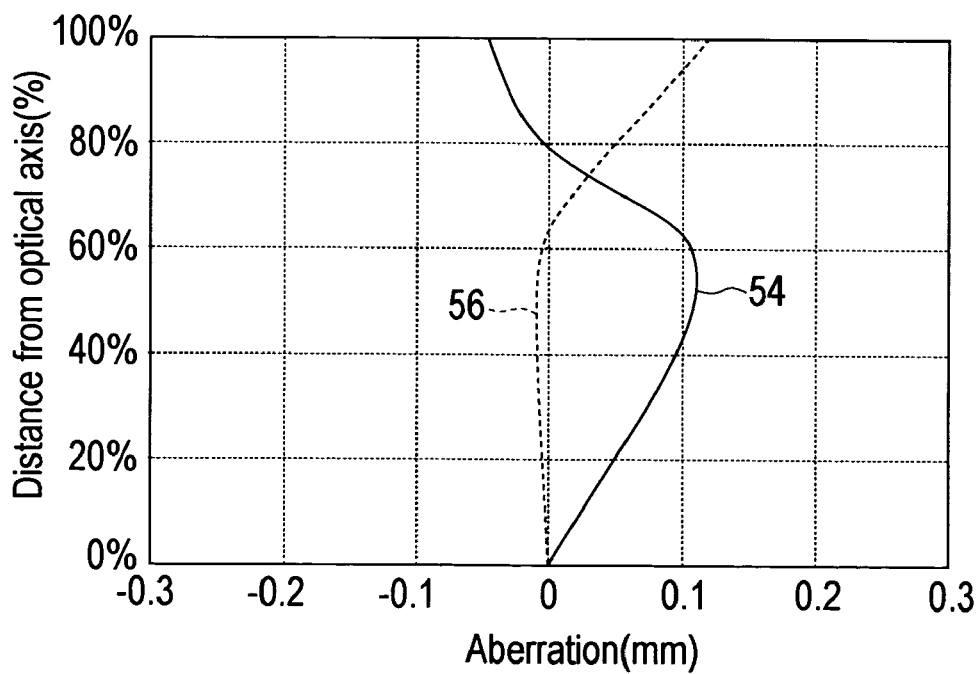
FIG. 12 is a view of astigmatism in the imaging lens of the third embodiment.
Figure 13:
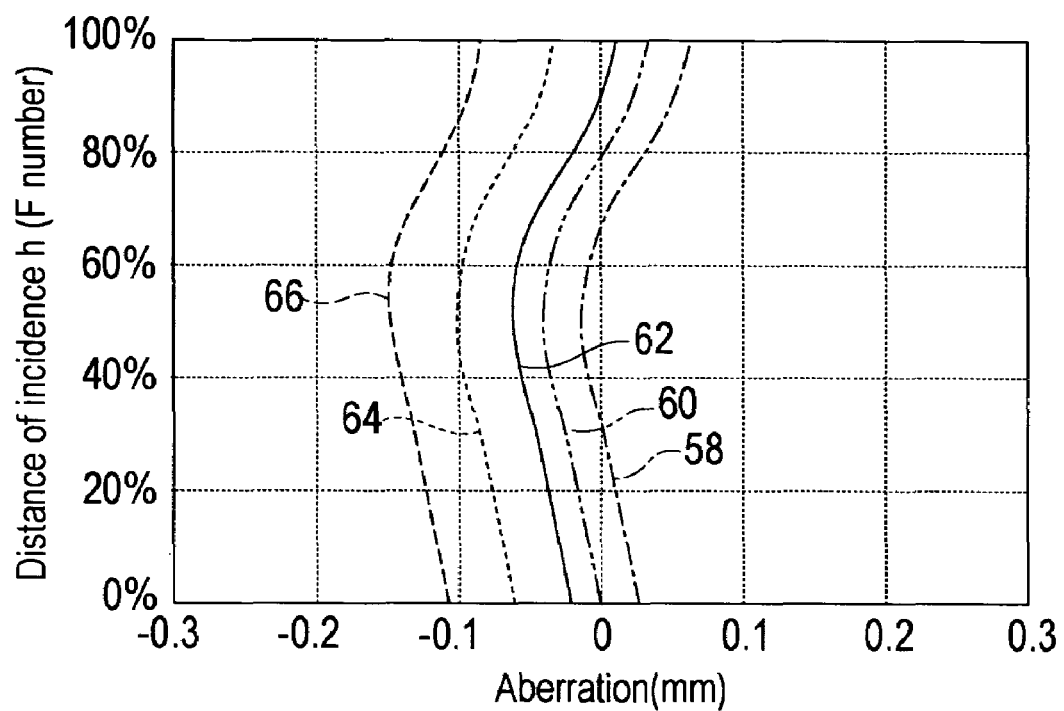
FIG. 13 is a view of chromatic/spherical aberration in the imaging lens of the third embodiment.

The distortion curve 52 shown in FIG. 11, the astigmatism curve (the aberration curve 54 relating to the meridional plane and the aberration curve 56 relating to the sagittal plane) shown in FIG. 12, and the chromatic/spherical aberration curve (the aberration curve 58 relating to the C line, the aberration curve 60 relating to the d line, the aberration curve 62 relating to the e line, the aberration curve 64 relating to the F line, and the aberration curve 66 relating to the g line) shown in FIG. 13 are respectively illustrated by graphs.

The ordinate of the aberration curves in FIGS. 11 and 12 illustrate the image height as a percentage of the distance from the optical axis. In FIGS. 11 and 12, 100%, 80%, 70%, and 60% correspond to 3.330 mm, 2.664 mm, 2.330 mm, and 1.998 mm respectively. The ordinate of the aberration curve in FIG. 13 indicates the distance of incidence h (F number), corresponding at its maximum to F3.2. The abscissa in FIG. 13 shows the magnitude of the aberration.

As regards distortion, the absolute value of the amount of aberration reaches a maximum of 1.70% in an image height position of 70% (image height 2.330 mm), and hence within a range of image height 3.330 mm and below, the absolute value of the aberration amount is held within 1.70%.

As for astigmatism, the absolute value of the aberration amount on the saggital plane reaches a maximum of 0.12 mm in an image height position of 100% (image height 3.330 mm), and hence within a range of image height 3.330 mm and below, the absolute value of the aberration amount is held within 0.12 mm.

As for chromatic/spherical aberration, the absolute value of the aberration curve 66 relating to the g line reaches a maximum of 0.15 mm at a distance of incidence h of 50%, and hence the absolute value of the aberration amount is held within 0.15 mm.

Fourth Embodiment (A) The focal length f of the entire lens system is f=6.52 mm.
(B) The object side curvature radius r1 of the first lens L1 is r1=2.4 mm.
(C) The image side curvature radius r2 of the first lens L1 is r2=8.3 mm.
(D) The back focus bf is bf=2.523 mm.
(E) The distance in air from the object side surface of the first lens L1 to the image surface, or in other words the optical length d, is d=8.229 mm.
(F) The distance D2 between the first lens L1 and second lens L2 is D2=0.58 mm.
(G) The thickness D3 at the center of the second lens L2 is D3=d5=1.76 mm.
(H) The focal length f1 of the first lens L1 is f1=5.79 mm.
(I) The focal length f2 of the second lens L2 is f2=48.22 mm.
(J) The focal length f3 of the third lens L3 is f3=−43.54 mm.

Hence $$r1/r2 = 2.4/8.3 = 0.289 \quad (1)$$

$$D2/f = 0.58/6.52 = 0.089 \quad (2)$$

$$D3/f = 1.76/6.52 = 0.2699, \text{ and} \quad (3)$$

$$d/f = 8.229/6.52 = 1.2621. \quad (4)$$

Thus the lens system of the fourth embodiment satisfies all of the following conditional expressions (1) through (4).

$$0.24 < r1/r2 < 0.34 \quad (1)$$

$$0.08 < D2/f < 0.1 \quad (2)$$

$$0.24 < D3/f < 0.29 \quad (3)$$

$$1.0 < d/f < 1.5 \quad (4)$$

As shown in Table 4, the aperture diaphragm S1 is provided in a position 0.11 mm (d2=0.11 mm) rearward of the second surface (the image side surface) of the first lens L1. The numerical aperture (F number) is 3.3, and the combined focal length f is 6.52 mm.

Figure 14:
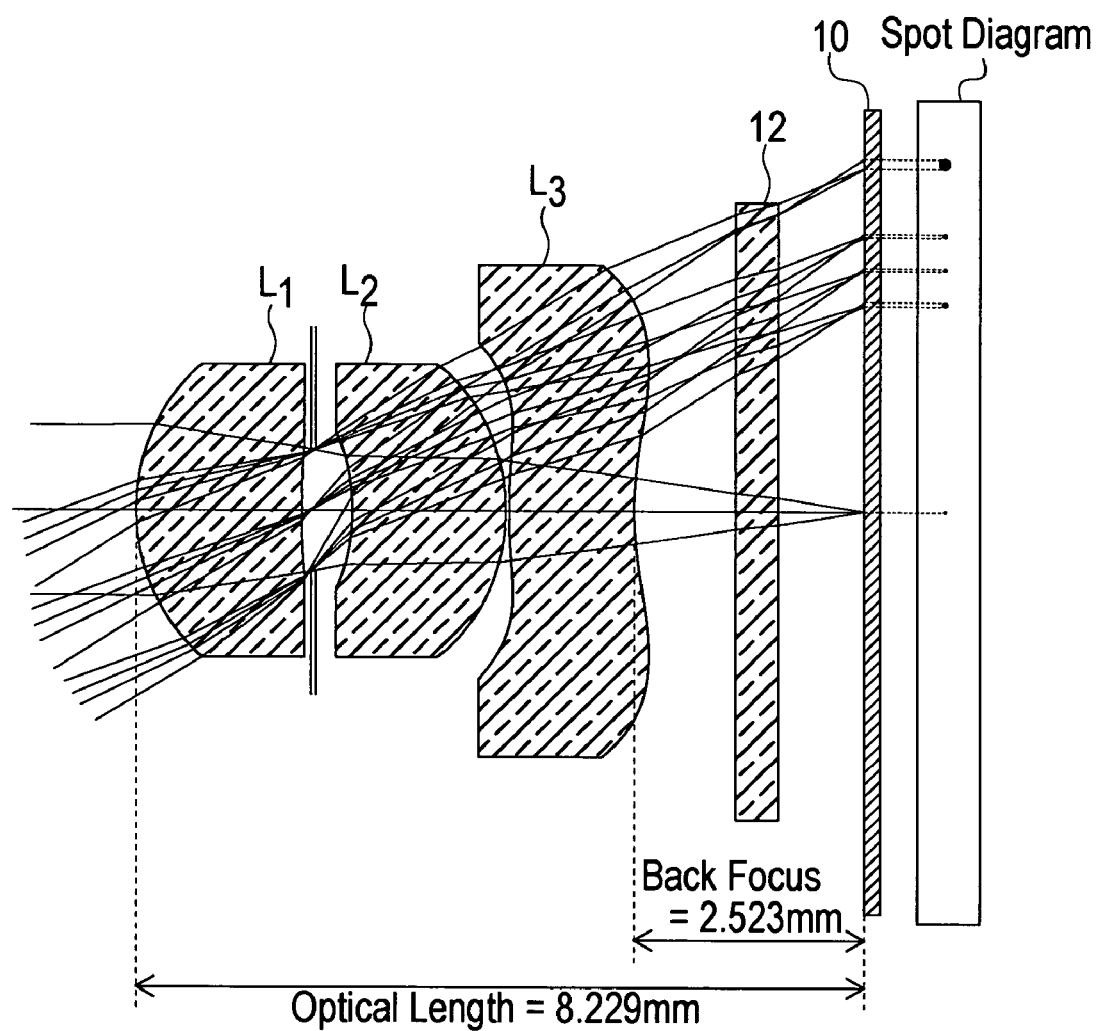
FIG. 14 is a sectional view of an imaging lens of a fourth embodiment.

FIG. 14 shows a sectional view of the imaging lens of the fourth embodiment.

The optical length is 8.229 mm, and hence this value is held within 9 mm. The back focus is 2.523 mm, and hence a sufficient length is secured.

Figure 15:
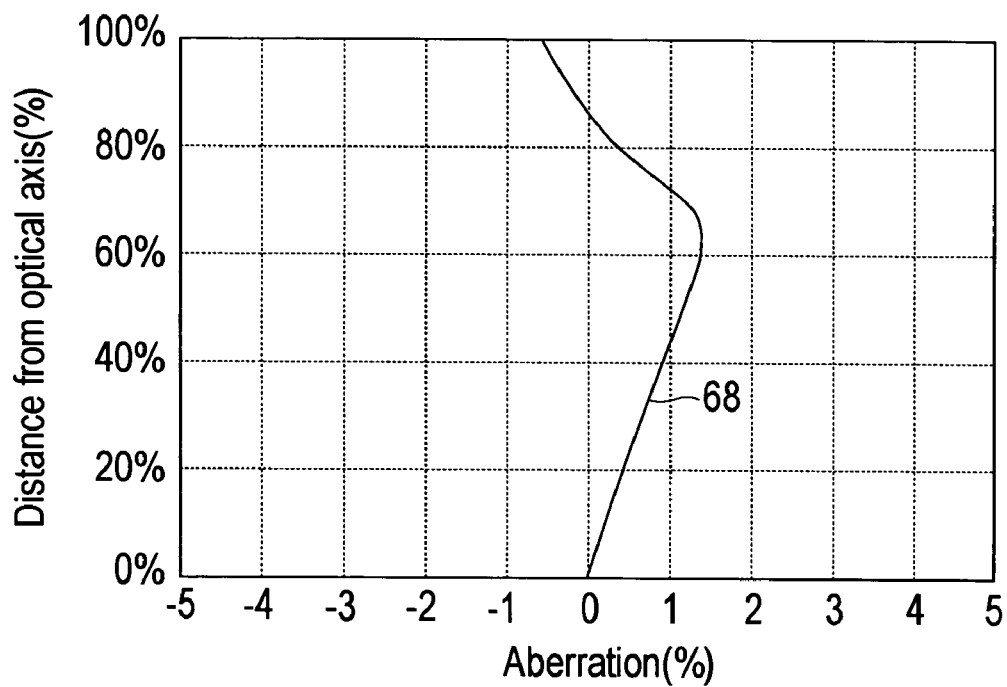
FIG. 15 is a view of distortion in the imaging lens of the fourth embodiment.
Figure 16:
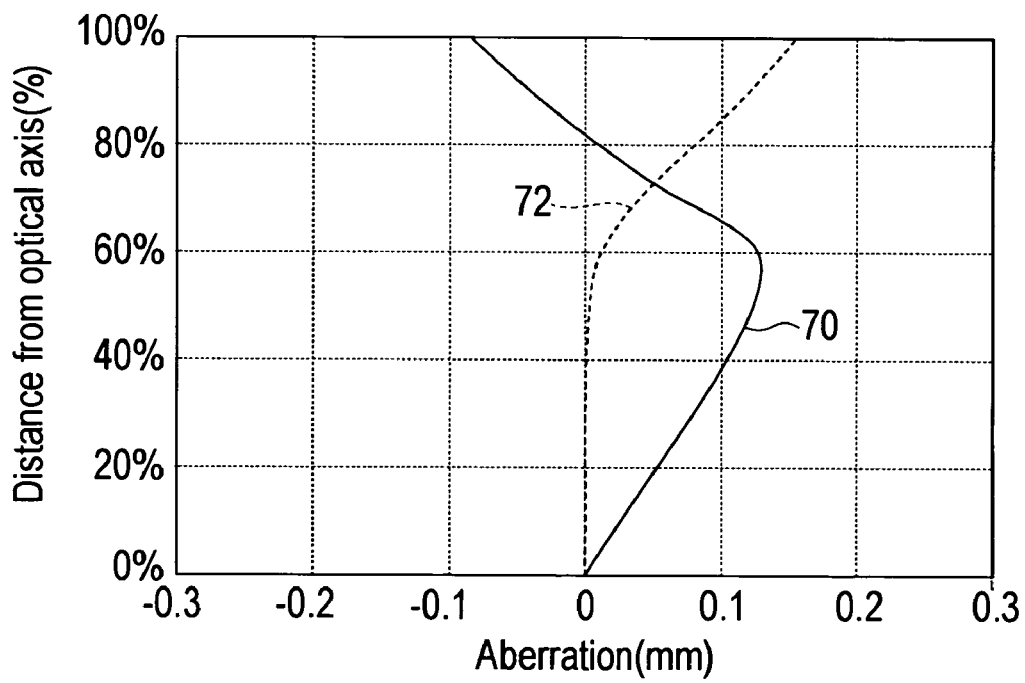
FIG. 16 is a view of astigmatism in the imaging lens of the fourth embodiment.
Figure 17:
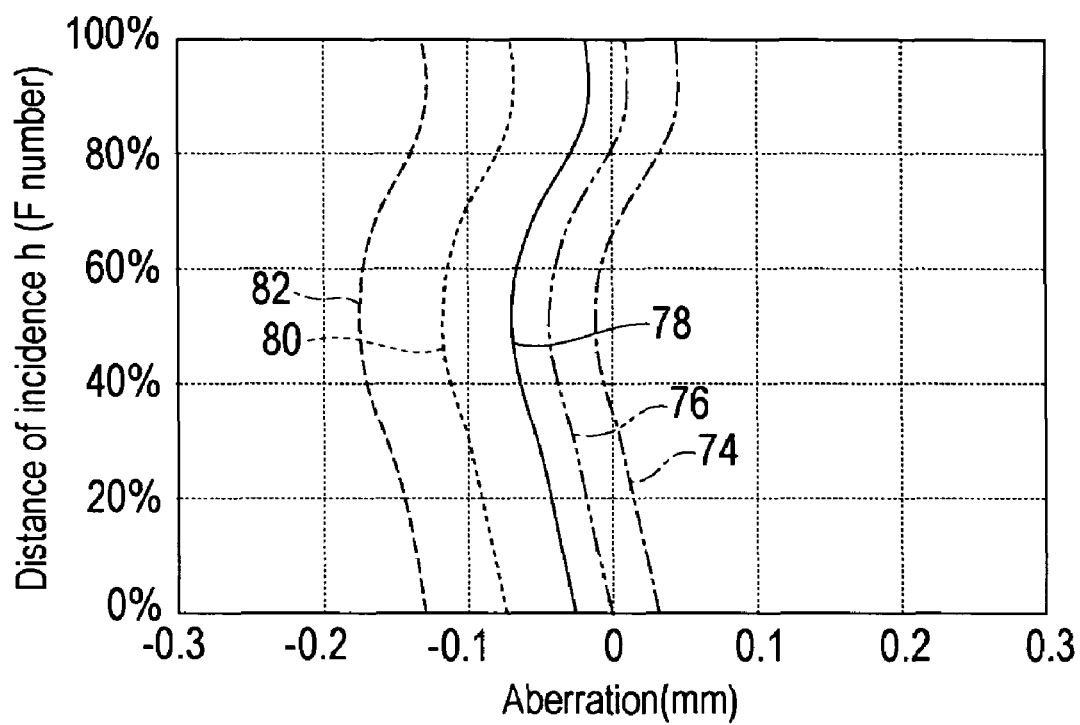
FIG. 17 is a view of chromatic/spherical aberration in the imaging lens of the fourth embodiment.

The distortion curve 68 shown in FIG. 15, the astigmatism curve (the aberration curve 70 relating to the meridional plane and the aberration curve 72 relating to the sagittal plane) shown in FIG. 16, and the chromatic/spherical aberration curve (the aberration curve 74 relating to the C line, the aberration curve 76 relating to the d line, the aberration curve 78 relating to the e line, the aberration curve 80 relating to the F line, and the aberration curve 82 relating to the g line) shown in FIG. 17 are respectively illustrated by graphs.

The ordinate of the aberration curves in FIGS. 15 and 16 illustrate the image height as a percentage of the distance from the optical axis. In FIGS. 15 and 16, 100%, 80%, 70%, and 60% correspond to 4.000 mm, 3.200 mm, 2.798 mm, and 2.400 mm respectively. The ordinate of the aberration curve in FIG. 17 indicates the distance of incidence h (F number), corresponding at its maximum to F3.3. The abscissa in FIG. 17 shows the magnitude of the aberration.

As regards distortion, the absolute value of the amount of aberration reaches a maximum of 1.39% in an image height position of 60% (image height 2.400 mm), and hence within a range of image height 4.000 mm and below, the absolute value of the aberration amount is held within 1.39%.

As for astigmatism, the absolute value of the aberration amount on the saggital plane reaches a maximum of 0.15 mm in an image height position of 100% (image height 4.000 mm), and hence within a range of image height 4.000 mm and below, the absolute value of the aberration amount is held within 0.15 mm.

As for chromatic/spherical aberration, the absolute value of the aberration curve 82 relating to the g line reaches a maximum of 0.17 mm at a distance of incidence h of 50%, and hence the absolute value of the aberration amount is held within 0.17 mm.

It was thus learned that in the imaging lenses of all of the embodiments described above, a sufficient performance for installation in a small camera using a CCD or CMOS as an imaging device is secured.

As is clear from the above description of the imaging lens of the present invention, by designing each of the lenses constituting the imaging lens so as to satisfy the conditional expressions (1) through (4), the problems to be solved by the present invention are solved. In other words, aberration is satisfactorily corrected, and an imaging lens having a sufficient back focus and a short optical length is obtained.

Note that in the embodiments described above, the plastic material ZEONEX 480R is used for the first lens, second lens, and third lens, but it goes without saying that plastic materials other than that cited in the embodiments, and also non-plastic materials such as glass or the like may be employed as long as the various conditions described in the embodiments and so on are satisfied.

As described above, according to the imaging lens of the present invention, an imaging lens in which various types of aberration are corrected satisfactorily, in which the optical length is a maximum of approximately 9 mm (at 8.229 mm, the optical length is at its longest in the imaging lens of the fourth embodiment), and which is thus suitable for use in a small CCD camera installed in a portable telephone or the like. In other words, according to the imaging lens of the present invention, satisfactory images can be obtained even with a short optical length, and a sufficient back focus can be secured. As shown in each of the embodiments of the present invention, in the imaging lens of the present invention the back focus is long enough to accommodate the insertion of a cover glass with a thickness of approximately 0.5 mm. More specifically, the back focus is 1.432 mm in the first embodiment, 1.457 mm in the second embodiment, 2.099 mm in the third embodiment, and 2.523 mm in the fourth embodiment. Hence the back focus of the imaging lens of the present invention is long enough to accommodate the insertion of a cover glass with a thickness of approximately 0.5 mm.

Also according to the imaging lens of the present invention, a cycloolefin plastic or a polycarbonate may be used as the lens material. Hence there is no need to employ expensive molded glass, thus enabling low-cost production and a reduction in weight.

As described above, the imaging lens of the present invention maybe used as a camera lens for installation in portable telephones, personal computers, or digital cameras, and may also be satisfactorily applied as a camera lens for installation in PDAs (personal digital assistants), a camera lens for installation in toys comprising an image recognition function, and a camera lens for installation in monitoring, surveying, and crime-prevention devices and so on.

What is claimed is:

1. An imaging lens comprising a first lens L1, an aperture diaphragm S1, a second lens L2, and a third lens L3, and constituted such that said first lens L1, said aperture diaphragm S1, said second lens L2, and said third lens L3 are arranged in succession from the object side to the image side, wherein said first lens L1 is a resin lens having a positive refractive power and a meniscus shape in which the convex surface faces the object side, said second lens L2 is a resin lens having a positive refractive power and a meniscus shape in which the convex surface faces the image side, and said third lens L3 is a resin lens having a negative refractivity, both surfaces of said first lens L1 being aspheric, both surfaces of said second lens L2 being aspheric, and both surfaces of said third lens L3 being aspheric, and said imaging lens satisfying the following conditions, $$0.24 < r1/r2 < 0.34 \quad (1)$$

$$0.08 < D2/f < 0.1 \quad (2)$$

$$0.24 < D3/f < 0.29 \quad (3)$$

$$1.0 < d/f < 1.5 \quad (4)$$

where f is the focal length of the entire lens system, r1 is the radius of curvature (axial curvature radius) of the object side surface of the first lens L1 in the vicinity of the optical axis, r2 is the radius of curvature (axial curvature radius) of the image side surface of the first lens Li in the vicinity of the optical axis, D2 is the distance between the first lens Li and second lens L2, D3 is the thickness at the center of the second lens L2, and d is the distance(in air) from the object side surface of the first lens LI to the image surface.

2. The imaging lens according to claim 1, wherein said first lens L1, said second lens L2, and said third lens L3 are formed from a material having an Abbe number between thirty and sixty.

3. The imaging lens according to claim 1, wherein said first lens L1, said second lens L2, and said third lens L3 are formed from a cycloolefin plastic material.

4. The imaging lens according to claim 2, wherein said first lens L1, said second lens L2, and said third lens L3 are formed from a cycloolefin plastic material.

* * * * *